UNITED STATES PATENT OFFICE.

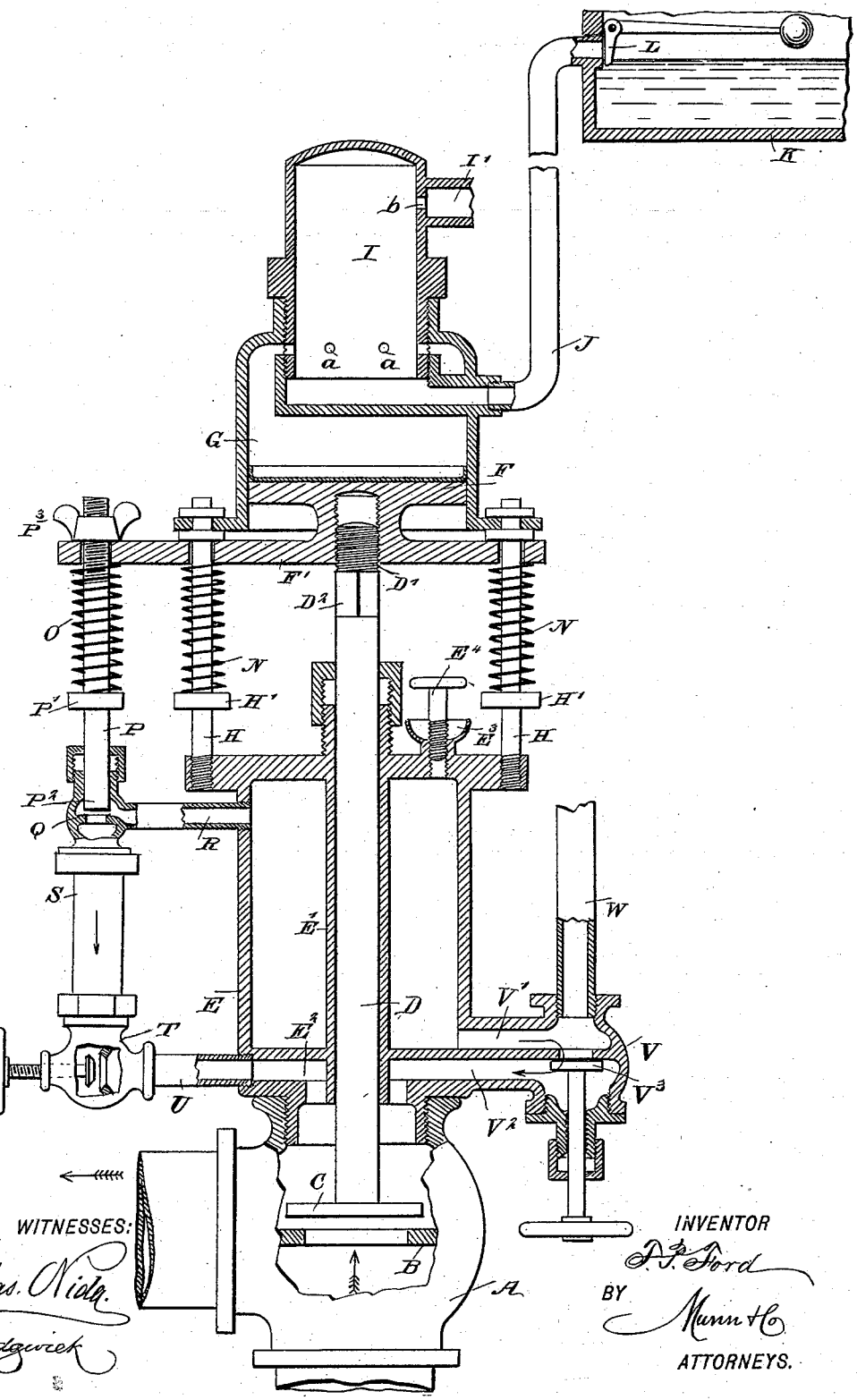

THOMAS P. FORD, OF BROOKLYN, NEW YORK.

VALVE.

SPECIFICATION forming part of Letters Patent No. 503,843, dated August 22, 1893.

Application filed March 3, 1893. Serial No. 464,556. (No model.)

*To all whom it may concern:*

Be it known that I, THOMAS P. FORD, of Brooklyn, in the county of Kings and State of New York, have invented a new and Improved Valve, of which the following is a full, clear, and exact description.

The invention relates to valves such as are shown and described in the Letters Patent of the United States No. 489,799, granted to me January 10, 1893.

The object of the invention is to provide a new and improved valve, which is simple and durable in construction, very effective and automatic in operation, and arranged to introduce a lubricant during the time the pump is in action.

The invention consists of a valve carrying a piston on its stem, a cylinder containing the said piston, a pressure vessel provided with an inlet and an outlet and connected by ports with the upper, closed end of the said cylinder, a water supply tank connected with the inlet of the said vessel, and a float valve in the said water supply tank and controlling the supply of water from the tank to the vessel.

The invention further consists of a valve carrying a piston controlled by fluid pressure, and a lubricator having a valve controlled by the said piston so that when the valve is seated the lubricator is shut off, and when the valve is unseated the lubricator feeds the lubricant.

The invention also consists of certain parts and details and combinations of the same, as will be fully described hereinafter and then pointed out in the claims.

Reference is to be had to the accompanying drawing, forming a part of this specification, in which the figure is a sectional side elevation of the improvement.

The improved valve is provided with the body A, in which is formed the usual valve seat B, the opening of which is adapted to be opened or closed by the valve proper C, held on the lower end of a valve stem D, extending upward through a bearing E' formed centrally in the lubricant receptacle or reservoir E, containing the lubricant to be passed into the valve body A, to flow with the fluid therein to the machinery to be lubricated. The upper, threaded end D' of the valve stem D screws in a piston F mounted to slide in a cylinder G supported on rods H, from the upper end of the reservoir E. The upper, closed end of the cylinder G is connected by one or more small ports $a$ with the lower end of a vessel I, forming the cap or head of the cylinder G, as is plainly shown in the drawing.

Near the upper end of the vessel I is arranged a port $b$, forming an outlet for discharging the water into a pipe I', leading to a suitable receptacle or other place. The lower end of the vessel I is connected by a pipe J with an over-head tank K, into which water is pumped when the pump is actuated, the said tank containing a float valve L controlling the outlet of the pipe J from the tank K, so that when the water rises in the latter the float unseats the valve L, to permit the water in the tank to pass through the pipe J into the vessel I, and from the latter through the ports $a$ into the upper end of the cylinder G, to exert a pressure on the piston F therein. When the water in the tank K falls, the valve L is seated to close the outlet of the pipe J from the tank K.

On the upper end of the piston F is arranged an arm F', fitted to slide on the rods H, which support the cylinder G, the said arm F' resting on springs N, coiled on the rods H and resting at their lower ends on collars H' attached to said rods. One end of the arm F' engages a rod P, on which is coiled a spring O pressing with its upper end against the said arm F' and resting at its lower end on a collar P' held on the said rod P. The lower end of the rod P extends into a valve body Q and forms a valve $P^2$ therein, adapted to open and close the valve seat in the valve body to make connection between the pipe R and the sight feed tube S, as is shown in the drawing, the pipe R leading from the upper end of the reservoir E. The lower end of the sight feed tube S connects with a valve T under the control of the operator and connected by a pipe U with a channel $E^2$ formed in the bottom of the reservoir E and leading into the valve body A above the valve seat B. A valve body V is arranged on one side of the reservoir E, and is provided with a channel V' leading to the lower end of the reservoir E, and also connecting with a pipe W leading to the condensing pipe. The body V is provided with a second channel $V^2$, leading to the valve body A above the valve seat B, so that when the valve V³ proper is opened the reservoir E can be drained of its contents. Ordinarily the valve proper V³ is closed.

The top of the reservoir E is provided with a feed cup E³ for introducing the lubricant to the reservoir and normally closed by a suitable cap or screw E⁴, as shown in the drawing. It will be seen that the reservoir E forms a cap for the valve body A and at the same time supports the cylinder G and vessel I, as shown and described.

Near the threaded end D' of the valve stem D is formed the square portion D², for conveniently applying a suitable tool to turn the said valve stem to screw the piston F farther up or down, so as to regulate the stroke of the valve C.

It will be seen that when the pump or other machine connected with the valve body A is started, the fluid passing through the valve body A in the direction of the arrows lifts the valve C, so that the piston moves upward in the cylinder G, as is shown in the drawing. In doing so, the piston F, by its arm F' engaging the wing nut P³ held on the upper, threaded end of the rod P, lifts the latter so that the valve end P² of the said rod is unseated and lubricant passes from the reservoir E through the pipe R and then down the sight feed tube, through the valve T and pipe U and channel E² into the valve body A upon the moving fluid, to pass with the latter to the pump or other machinery. The pump discharges part of its water to the tank K, and when the predetermined level is reached therein, then the float of the valve L opens the latter, so that the water can flow from the tank through the pipe J, into the vessel I, and from the latter through the ports $a$ into the upper end of the cylinder G, to exert a pressure on the piston F, corresponding to the hydrostatic pressure of the column of water extending from the tank K to the said piston. The pressure exerted on the piston F thus forces the latter to slide downward in the cylinder G, so that the valve C is moved toward its seat, and if the pressure is sufficient, closes the seat B to shut off the supply to the pump or other machinery. At the same time the downward movement of the piston F causes the arm F' to exert a pressure on the spring O, which by resting on the collar P' of the rod P, forces the latter downward, so that the valve P² seats itself and the supply of lubricant to the sight feed tube S is shut off.

Part of the water in the vessel I can leak out through the small port $b$, so that when the level of the water in the tank K falls to permit the valve L to close the pipe J, then the column of water will pass slowly out at the port $b$ to relieve the piston F of the hydrostatic pressure. The valve C will then again open on the further pressure of the fluid flowing through the valve body A in the direction above mentioned, and the above described operation is repeated; that is, the valve P² is unseated and lubricant is again fed to the moving parts in the body A.

By adjusting the wing nut P³, the stroke of the valve rod P is regulated so that more or less lubricant is fed down the sight feed tube.

In order to charge the reservoir I, it is necessary to close the valves V³ and T, and to open the feed cap E³, so that the lubricant can be poured through the latter to fill the reservoir. The feed cap is then again closed and the valve T is opened, while the valve V³ remains shut. The latter is opened only for cleaning the reservoir E and driving the water which accumulates therein into the valve body A.

Having thus fully described my invention, I claim as new and desire to secure by Letters Patent—

1. In a device of the class described, the combination with a valve carrying a piston on its stem, of a cylinder containing the said piston, a vessel provided with an inlet and an outlet and connected by ports with the upper, closed end of the said cylinder, a water supply tank connected with the inlet of the said vessel, and a float valve arranged in the said tank and adapted to open and close the connection between the tank and vessel, substantially as shown and described.

2. In a device of the class described, the combination with a valve carrying a spring-pressed piston on its stem, of a cylinder containing the said piston, a vessel provided near its lower end with an inlet and at its upper end with a small draining port, the said vessel being also connected by ports with the upper, closed end of the said cylinder, a pipe connected with the inlet of the vessel, an overhead tank connected with the said pipe, and a float valve arranged in the said tank and controlling the said pipe, substantially as shown and described.

3. In a device of the class described, the combination with a valve carrying a piston controlled by fluid pressure, of a lubricant reservoir, a sight feed tube connected with the said reservoir, and a valve for the said sight feed tube and controlled by the said piston, so that when the valve is seated the lubricator is shut off, and when the valve is unseated the lubricator feeds the lubricant, substantially as shown and described.

4. In a device of the class described, the combination with a valve carrying a piston controlled by fluid pressure, of a lubricant reservoir, a sight feed tube connected with the said reservoir, a valve for the said sight feed tube and controlled by the said piston, so that when the valve is seated the lubricator is shut off, and when the valve is unseated the lubricator feeds the lubricant, and means for regulating the stroke of the said valve for the sight feed tube, substantially as shown and described.

5. In a device of the class described, the combination with a valve carrying a spring-pressed piston controlled by fluid pressure, of a lubricant reservoir, a sight feed tube connected with the said reservoir, a spring-pressed valve for the said sight feed tube and connected with the said piston, and a wing nut screwing on the stem of the said sight feed tube valve to regulate the stroke thereof, substantially as shown and described.

THOMAS P. FORD.

Witnesses:
   THEO. G. HOSTER,
   C. SEDGWICK.